United States Patent Office 3,287,296
Patented Nov. 22, 1966

3,287,296
BITUMINOUS SURFACING COMPOSITION
Eugene Wittner, Florissant, Mo., assignor to Shell Oil Company, New York, N.Y., a corporation of Delaware
No Drawing. Filed July 12, 1962, Ser. No. 209,303
13 Claims. (Cl. 260—22)

This invention relates to new bituminous compositions. More particularly, the invention relates to new bituminous compositions which are especially suited for use as surface compositions for concrete, asphalt, wood, steel and the like.

Specifically, the invention provides novel and particularly useful compositions comprising a mixture of (1) a bituminous material, such as asphalt, and (2) a polyester prepared from (A) a bituminous-compatible polyol, such as castor oil, and (B) pyromellitic dianhydride.

Bituminous surfacing compositions have been prepared from mixtures of asphalt with a multitude of other components, such as, for example, epoxy resins, polyurethane resins, polyesters, and polysulfide polymers, among others. Each of these compositions, however, suffer from one or more shortcomings which restrict their use. A number of these shortcomings have been overcome by the use of a bituminous surfacing composition comprising an asphalt, an epoxy resin and a polymerized unsaturated long chain acid. While this bituminous composition supplied the need for better materials for the use in the construction of roadways, walkways and the like, it still does not have the desired viscosity or pot life for some applications.

It has now been found that the bituminous compositions of the present invention possess the unexpected property of lower viscosity. It is also possible to prepare these new and useful compositions at a lower temperature than the epoxy resin/asphalt compositions and thereby greatly increase the pot life of the uncured compositions. These desirable properties are unexpectedly obtained while still retaining the other desirable properties possessed by other bituminous compositions, such as, for example, the cured composition is a thermoset, heat-resistant, solvent-resistant elastic, extensible, strong and tack-free composition. The properties make the bituminous composition of the present invention especially suitable for use as a compound for casting, potting, sealing, and as adhesives and binders as, for example, in laminates.

It is therefore an object of the present invention to provide a new class of bituminous compositions. It is another object to provide new and valuable bituminous compositions which are useful for surface coatings which have excellent resistance to heat, water and solvents as well as improved flexibility. It is still another object to provide new and useful bituminous compositions which have reduced viscosity. It is a further object to provide new bituminous compositions which can be prepared more economically than the epoxy resin/asphalt compositions. It is still a further object to provide bituminous compositions which are especially suitable for preparing laminates. Other objects and advantages of the invention will be apparent from the following detailed description thereof.

It has now been found that these and other objects may be accomplished by the new products of the invention comprising a mixture of (1) a bituminous material, such as asphalt, and (2) a polyester prepared from (A) an asphalt-compatible polyol, such as castor oil and (B) pyromellitic dianhydride.

It has been unexpectedly found that these above-described mixtures form compatible films and coatings which when cured have excellent adhesion to concrete, asphalt, wood, paper and metal surfaces. These surface coatings are very tough and flexible and have excellent resistance to solvent, water and heat.

It has also been unexpectedly discovered that the compositions of the present invention may be prepared at generally lower temperatures than used to prepare epoxy resin/asphalt compositions thereby greatly increasing the effective pot life of the uncured compositions.

The compositions of the present invention have been found extremely useful as a compound for casting, sealing and potting as well as for use as adhesives and binders for the preparation of coatings and laminates.

It has further been found that these bituminous compositions are excellent binders for aggregate and in combination therewith form compositions which can be used to form superior roadways, airfields, walkways and the like. The roadways prepared from these special compositions have excellent wearability, excellent heat, water and solvent resistance and good skid resistance. In addition, the wear resistance and resistance to weather are outstanding for such coatings.

When small inert particles are added to the compositions before or during cure, the cured coatings are particularly suitable for use on highways and runways as they can be easily applied to large areas and set up without the use of any special curing compositions.

The bituminous materials used in the compositions of the present invention include substances containing bitumens or pyrobitumens, pyrogeneous distillates and tar, pyrogeneous waxes and pyrogeneous residues (pitches and pyrogeneous asphalts). They are preferably composed mainly of hydrocarbons although they may contain amounts of sulfur, nitrogen and oxygen-containing materials. They also are preferably fusible and largely soluble in carbon disulfide. Examples of such bituminous materials may be found in Abraham's "Asphalts and Allied Substances," vol. I, page 57, 5th edition.

An especially preferred group of bituminous materials to be used in the compositions of the invention include the asphalts. These asphalts may be straight run, blown, cracked and catalytically or noncatalytically polymerized asphalts. All such asphalts are useful regardless of their original penetrations or softening points.

Especially preferred are the straight run asphalts used for paving, such as those having penetrations between 40 and 300 and softening points within the range from about 145° F. to about 95° F. Blown asphalts are normally produced in the presence or absence of catalysts by blowing asphalts or fluxes at elevated temperatures with an oxygen-containing gas such as air. Typical blown asphalt may be softening point range of between about 300° F. and about 120° F. and a penetration within the range from about 100 to about 0.

Aromatic asphalts, such as those comprising the bottoms products from the distillation of catalytically cracked gas oil, are also preferred.

Other preferred materials include high boiling extracts of petroleum, such as those obtained by extracting petroleum with solvents having preferential selectivity for aromatic. To obtain such extracts various non-reactive, highly polar, aromatically preferential solvents are used such as liquid $SO_2$, phenol, cresylic acid, furfural, beta,-beta-dichloroethyl ether, nitrobenzene and the like. The use of the so-called double solvent process employing mutually immiscible solvents like cresylic acid and propane also give suitable extracts. Especially preferred are the Edeleanu and furfural extracts of petroleum distillates, i.e., extracts obtained by use of liquid $SO_2$ or liquid $SO_2$ in combination with benzene, etc. The extracts are high-boiling materials which range in general from viscous liquids to tar-like materials at ordinary temperatures. Extracts boiling above 300° C. at 760 mm. Hg are preferred.

Another preferred group of bituminous materials include residual fuel oils, such as residual fuel oils having a viscosity from 10 cs. at 100° F. to about 1500 cs. at 100° F.

Also preferred are the products derived from coal such as coal tars, refined coal tars and coal tar pitches and preferably those having a softening point below 190° F. and a solubility in carbon disulfide of at least 50%. The expression "tar" as used herein refers to products obtained in connection with the destructive distillation of coal. When part of the volatile material is removed, the residue is termed "coal tar pitch." Residuals having a fusing point below about 90° F. are referred to herein as refined coal tar while those having fusing points of 90° F. or above are coal tar pitches. As used herein, in reference to coal tar products, "softening point" or "fusing point" refers to values obtained by the cube method as described in vol II, Abraham, "Asphalts and Allied Substances," 5th edition. The coal products should possess at least 50% and preferably 75% solubility in carbon disulfide. The coal tar, refined coal tar and coal tar pitch may be acidic, basic or neutral, depending on whether the acid and/or bases have been removed. These coal products may be obtained from various types of bituminous coals, such as, for example, cannel, bog-peat, carbonite, and the like, and may be derived from various processes, such as from gas works, coke ovens, blast furnaces, gas producers and various low temperature processes. Description of examples of various coal tars, refined coal tars and coal tar pitches may be found on pages 384 to 405 of Abraham, "Asphalts and Allied Substances."

Particularly preferred coal derivatives to be used in preparing the compositions of the present invention include the residuals resulting from distillation of coal tar, and preferably refined coal tars having a fusing point of below 70° F. and a solubility in carbon disulfide of at least 75% with a specific gravity of 1.10 and 1.50 and low melting coal tar pitches having a fusing point below 120° F. and a solubility in carbon disulfide of at least 75%.

The polyesters suitable for use in the present bituminous compositions are those prepared by reacting a bituminous-compatible polyol and a dianhydride. The expression "bituminous-compatible" polyol as used herein refers to any polyol that when mixed with a bituminous material such as asphalt or coal tar form a dispersion or solution therein. Examples of suitable polyols include, among others, castor oil; various derivatives of castor oil, such as alkyl ricinoleates (alkyl esters of ricinoleic acid), acetyl ricinoleates (prepared by the partial esterification of polyols, such as ethylene glycol, propylene glycol, glycerol and the like with ricinoleic acid) and gelled castor oil; hydroxy esters of polymeric acids; and alkylene oxide adducts of polyols such as glycerol. Castor oil and its above-noted derivatives are available commercially under such trade names as Flexricin and Polycin.

The hydroxy esters of polymeric acids may be prepared by the usual method of esterification, that is, a polyol is reacted with a polymeric long chain fatty acid at a temperature generally from about 150° C. to 300° C. An esterification catalyst may be employed as desired. Suitable esterification catalysts include, among others, the acid catalysts, such as sulfuric acid and p-toluene sulfonic acid. Examples of suitable polyols are ethylene glycol, propylene glycol, hexane triol and glycerol. The polymeric acids preferred for preparing the polyols for use in the compositions of the present invention are those obtained by polymerizing unsaturated long chain acids under known conditions, such as heat, peroxide and the like. Examples of long chain acids that may be used for this purpose include those containing at least 10 carbon atoms, and preferably more than 14 carbon atoms, such as, for example, dodecenedioic acid, 10,12-eicosadienedioic acid, tetradecenoic acid, linoleic acid, linolenic acid, eleostearic acid and licannic acid.

Normally, the polymerization is effected by utilizing the lower aliphatic esters of the unsaturated acids so as to prevent decarboxylation during the heating period, and then removing the ester groups through hydrolysis. This process is illustrated in the Industrial and Engineering Chemistry article, page 1139, vol. 38 (1946). The structure of some of the polymerized acids are shown in Industrial and Engineering Chemistry, vol. 33, page 89 (1941).

Particularly preferred are the trimerized acids obtained from the ethylenically unsaturated fatty acids as derived from semi-drying and drying oils, and particularly the conjugated fatty acids containing from 12 to 20 carbon atoms. The generic structure of the resulting trimerized acids is believed to be that of the following:

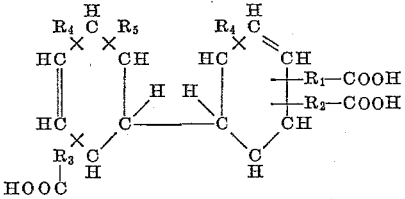

In the above formula, $R_1$, $R_2$ and $R_3$ constitute alkylene radicals having between 4 and 10 carbon atoms each, while $R_4$, $R_5$ and $R_6$ are alkyl radicals having between 4 and 10 carbon atoms each. Normally, the products will have the generic formula as follows:

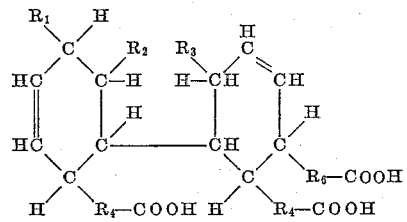

Particularly preferred polyols because of the commercial availability and because of the outstanding results obtained include castor oil, ethylene glycol mono-ricinoleate, propylene glycol mono-ricinoleate and glyceryl mono-ricinoleate.

Other polyols which are suitable for use in the present compositions include the adducts of alkylene oxide and polyols. Example of alkylene oxides include, among others; propylene oxide, butylene oxide, amylene oxide and styrene oxide, either substituted or unsubstituted; such substituents, if present, being preferably aliphatic hydrocarbon groups, such as methyl, ethyl, propyl, butyl and the like. Particularly preferred are the alkylene oxides having at least 3 carbon atoms, and more preferably from 3 to 8 carbon atoms. Especially suitable is butylene oxide because of its commercial availability and because polyols of outstanding compatibility are obtained.

Examples of suitable polyols include, among others, ethylene glycol, propylene glycol, hexane triol, butane diol, 1,2,6-trimethylolpropane, pentaerythritol and glycerol. Particularly preferred are the aliphatic polyhydroxy compounds having from 2 to 15 carbon atoms, with glycerol being especially preferred.

Suitable polyol condensation products can be prepared by condensing an alkylene oxide such as butylene oxide with a polyol such as glycerine under known conditions. Preferably, such condensation products are prepared using a basic catalyst such as, for example, an alkali metal, an alkali metal hydride or an alkali metal hydroxide.

Thus, for example a polyol, such as glycerine is placed in a reactor together with, if desired, a catalyst such as anhydrous sodium or potassium hydroxide. The alkylene oxide, such as butylene oxide is then introduced into the reactor under pressure and the reactor products heated to from 50° C. to 200° C. with from 80° C. to 150° C. being generally preferred. The amount of alkylene oxide reacted with the polyol is that quantity which produces a product having a molecular weight generally between, say, 500 and 10,000 as determined by hydroxyl number. In general, the reaction may be conducted at atmospheric pressure or at pressures up to, say, 100 p.s.i.

The reaction is usually performed under an inert atmosphere such as nitrogen and the caustic catalyst may be neutralized with an acid such as sulfuric acid and the product subsequently filtered. A number of these alkylene oxide/polyol adducts are available commercially.

The compositions of the invention may be prepared by a variety of different methods. The polyesters may be first prepared by partially reacting the polyol with the pyromellitic dianhydride and then adding this intermediate reaction product to the bituminous material. Another, and preferred method, is to first disperse the dianhydride in the bituminous material and then add the polyol to this mixture, stir thoroughly and apply the composition. If desired, the polyol may be first dispersed in the bituminous material followed by the addition of the dianhydride.

A very suitable method was found to consist of dispersing an appropriate amount of pyromellitic dianhydride in a 200/300 penetration asphalt at 120° C., then adding an equivalent amount of castor oil, stirring for about a minute, casting the composition into the desired form, and curing by heating at 120° C. for 4 hours or less. In general, gelation takes place within about 45 minutes.

The composition may also be prepared by mixing the pyromellitic dianhydride with inert particles and then combining this mixture with the bituminous material/polyol mixture. Thus, for use in surface composition; an appropriate amount of pyromellitic dianhydride is first mixed with hot aggregate. A mixture of paving asphalt and castor oil is then intimately mixed with the dianhydride/aggregate and spread on a surface and allowed to set hard.

An especially preferred type of composition covered by the present invention includes those wherein small inert solid particles are used to give the coating excellent skid resistance. The particles should be rather finely divided and preferably have a mesh size varying from 20 to 300. Preferred materials include sand, finely divided rocks, finely divided shells, crushed quartz, aluminum oxide, finely divided resinous particles, and the like. Particularly preferred are the minerals, and especially the siliceous materials, such as, for example, sand and ground rock. Mixtures of various types of particles may also be used.

An especially preferred type of composition include those in which inert particles such as aggregate, sand, etc, are added before, during or after the preparation of the compositions. If the compositions are to be used as binders for aggregate in constructing new roadways, airfields, walkways and the like, the aggregate is preferably added during or after the preparation of the compositions. If the compositions are to be used as surfacing compositions to form non-skid surface coatings, the aggregate is preferably added after the coating has been spread although the aggregate may be added before or during the preparation as well. It may also be desirable to add a part of the inert particles during the preparation, applying to the surface, then spreading additional inert particles on this surface. In the case of coating highways and walkways, it is generally preferred to apply the inert particles after the composition has been spread on the road or walkway. Excess particles may be removed after cure has taken place.

The amount of inert particles to be added to the composition in forming non-skid coatings should be at least 50% by weight of the total mixture of bituminous material and polyester resin, and should preferably be between 70% and 500% by weight of the mixture.

In general, although the polyesters in the present invention are prepared from stoichiometric amounts of the polyol and dianhydride, that is, an amount is used so as to provide one OH group for each anhydride group, an excess of either reactant may be employed. Economic and other practical considerations, however, usually dictate against the use of more than 10% by weight excess of either reactant.

Although the ratio of polyester to bituminous material may range quite widely, depending upon the ultimate use, from 40 to 80 parts by weight of bituminous material and from 20 to 60 parts by weight of polyester have been found very suitable. A particularly preferred range is from 60 to 70 parts bituminous material and from 30 to 40 parts polyester.

Advantages of the invention are illustrated in the following examples. The reactants, and their proportions, and other specific ingredients of the recipes are presented as being typical and various modifications can be made in view of the foregoing disclosure and discussion, without departing from the spirit or scope of the disclosure or of the claims. Unless otherwise specified, parts and percentages disclosed in the examples are by weight.

*Example I*

This example illustrates the preparation and properties of the bituminous compositions of the present invention.

9.3 parts of pyromellitic dianhydride are dispersed in 60 parts of 200/300 penetration paving asphalt at 120° C. Then 30.7 parts of castor oil is added and the mixture is well stirred for one minute. This composition is cast into the desired form and cured by heating at 120° C. for 4 hours. Gelation took place within 40 minutes and the cured composition is a thermoset, heat resistant, solvent resistant, elastic, extensible, tack-free composition possessing the following properties:

| | |
|---|---|
| Tensile strength (p.s.i.) | 213 |
| Elongation at break (percent) | 244 |
| Swelling ratio | 2.4 |
| Shore A hardness | 62 |
| Curing rate (time to reach 60 poises at 250° F.) (min.) | 32 |
| Stiffness in flexure at −10° F. | 26,500 |
| Angle of deflection at break at −10° F. (degrees) | >90 |

Related results are obtained when the 200/300 penetration asphalt is replaced with equivalent amounts of the following: refined coal tar, extract of petroleum distillate (Dutrex 22), bottoms obtained from the distillation of a catalytically cracked gas oil, a residual fuel oil and an Edeleanu extract of petroleum distillate.

*Example II*

14.0 parts of pyromellitic dianhydride are dispersed in 70 parts of 200/300 penetration asphalt at 120° C. Then 16.0 parts of glyceryl mono-ricinoleate is added and the mixture intimately mixed, a casting is then prepared which is allowed to set hard at 120° C. The resulting coating is elastic, extensible, and tack-free as well as exhibiting excellent resistance to solvents and hot water.

In a related experiment, 100% by weight of sand was incorporated and intimately mixed with the composition and allowed to cure while cooling from 120° C. to ambient temperature. The resulting coating was hard and flexible and had good resistance to solvents and good skid resistance.

*Example III*

8.5 parts of pyromellitic dianhydride are mixed with 100 parts of 40 mesh crushed quartz. To this aggregate mixture is then added a mixture consisting of 65 parts of 200/300 penetration asphalt and 26.5 parts of castor oil at 250° F. After thorough mixing, the composition is spread on an asphalt surface and allowed to cure while cooling to ambient temperature. The resulting surface coating is hard and tough as well as solvent and heat resistant.

Related results are obtained when the castor oil is replaced by an equivalent amount of each of the following: ethylene glycol mono-ricinoleate, propylene glycol mono-ricinoleate and glyceryl mono-ricinoleate.

Example IV 12 parts of pyromellitic dianhydride are dispersed in 50 parts of 200/300 penetration paving asphalt at 120° C. Then 32 parts of a hydroxy ester prepared by reacting at 175° C. glycerol and trimerized linoleic acid in the presence of p-toluene sulfonic acid catalyst, are added, mixed for several minutes, cast into the desired form, and cured by heating at 120° C. for 3 hours. The resulting casting is flexible, hard and has excellent resistance to heat and solvents.

Related results are obtained when refined coal tar or an extract of petroleum distillate (Dutrex 20) is used in lieu of the asphalt.

Example V

The procedure of Example I is substantially repeated except that the castor oil is replaced with an equivalent amount of a polyol prepared by the condensation of butylene oxide with glycerine. The castings thus prepared are hard, elastic and extensible and exhibit excellent heat and solvent resistance.

Related results are obtained when the butylene oxide/glycerol polyol is replaced with an equivalent amount of a butylene oxide-amylene oxide/glycerol polyol adduct.

I claim as my invention:

1. A composition consisting essentially of (1) a bituminous material and (2) a polyester prepared from (A) a bituminous-compatible polyol and (B) pyromellitic dianhydride.
2. A composition as in claim 1 wherein the bituminous material is asphalt.
3. A composition as in claim 1 wherein the bituminous material is a residual fuel oil.
4. A composition as in claim 1 wherein the bituminous material is a coal tar derivative.
5. A composition as in claim 1 wherein the bituminous material is an Edeleanu extract of petroleum distillate.
6. A composition as in claim 1 wherein the polyol is castor oil.
7. A composition as in claim 1 wherein the polyol is a castor oil derivative.
8. A composition as in claim 1 wherein the polyol is a hydroxy ester of a long chain polymeric fatty acid.
9. A composition as in claim 1 wherein the polyol is an adduct of a polyol and an alkylene oxide.
10. A composition as in claim 1 wherein the polyol is an adduct of glycerol and butylene oxide.
11. A process for preparing a bituminous material which comprises mixing a composition consisting essentially of bituminous material, a bituminous-compatible polyol and pyromellitic dianhydride together and then heating.
12. A process for preparing a non-skid coating which comprises applying to the surface to be coated a composition consisting essentially of a bituminous material, a bituminous-compatible polyol and pyromellitic dianhydride, spreading finely divided inert particles over the coating and then allowing the coating to cure.
13. A process for preparing a non-skid coating which comprises mixing a composition consisting essentially of aggregate and pyromellitic dianhydride with a composition consisting essentially of a bituminous material and a bituminous-compatible polyol, applying said mixed composition to the surface to be coated and then allowing the coating to cure.

References Cited by the Examiner

UNITED STATES PATENTS

| | | |
|---|---|---|
| 2,906,720 | 9/1959 | Simpson. |
| 3,008,387 | 11/1961 | Wittenwyler. |
| 3,161,114 | 12/1964 | Wittenwyler _____ 94—22 |
| 3,225,065 | 12/1965 | Hyde _____ 260—75 |

LEON J. BERCOVITZ, *Primary Examiner.*

MILTON STERMAN, *Examiner.*

J. ZIEGLER, R. W. GRIFFIN, *Assistant Examiners.*